United States Patent [19]

Cawthorne

[11] Patent Number: 4,682,238

[45] Date of Patent: Jul. 21, 1987

[54] ENERGY-EFFICIENT LIGHTING SYSTEM FOR TELEVISION

[75] Inventor: Duane C. Cawthorne, Amarillo, Tex.

[73] Assignee: The United States of America as represented by the United States Department of Energy, Washington, D.C.

[21] Appl. No.: 823,546

[22] Filed: Jan. 29, 1986

[51] Int. Cl.⁴ .................................... H04N 5/238
[52] U.S. Cl. ................................ 358/228; 358/211
[58] Field of Search ............ 358/228, 211, 214, 219, 358/909

[56] References Cited

U.S. PATENT DOCUMENTS

| 4,158,859 | 6/1979 | Kerbel | 358/228 |
| 4,423,436 | 12/1983 | Kimura | 358/228 |
| 4,482,920 | 11/1984 | Yoshida et al. | 358/228 |

FOREIGN PATENT DOCUMENTS 0010882  1/1985  Japan .................. 358/211

Primary Examiner—Gene Z. Rubinson
Assistant Examiner—Stephen Brinich
Attorney, Agent, or Firm—George H. Libman; Judson R. Hightower

[57] ABSTRACT

A light control system for a television camera comprises an artificial light control system which is cooperative with an iris control system. This artificial light control system adjusts the power to lamps illuminating the camera viewing area to provide only sufficient artificial illumination necessary to provide a sufficient video signal when the camera iris is substantially open.

9 Claims, 6 Drawing Figures

Normal Light Video Signal

Low Light Video Signal

ENERGY-EFFICIENT LIGHTING SYSTEM FOR TELEVISION

The United States Government has rights in the invention under Department of Energy Contract DE-AC04-76DP00487 with Mason & Hanger, Silas Mason Co., Inc.

BACKGROUND OF THE INVENTION

The present invention relates generally to a television lighting control system, and more particularly to an energy-efficient system of lighting the field of view of a television camera.

There are many applications when people who control a portion of land desire to keep other people from entering their portion of land. For example, a security force may be tasked with preventing unauthorized persons from crossing a strip of land bordering a prison, industrial plant, country, etc. For most such applications, indiscriminate life threatening devices such as vicious dogs and land mines may provide adequate security but they have consequences not always acceptable to society. Therefore, the controllers must trade-off the amount of money they will spend on acceptable security measures versus their risk if the money is not spent.

One of the most effective, but expensive, acceptable security measures is a human guard. To minimize the number of guards needed, television is often used so that one centrally located guard can monitor a number of remote sites. In this situation, each remote site has at least one television camera for transmitting a picture of a viewing area to a television monitor at the guard's location. If unauthorized activity is noted on the television monitor, the guard may take appropriate action.

A television camera has an optical system including a lens for receiving light from the viewing area and an active vacuum or solid-state element for converting impinging light to an electrical signal. Natural light during daylight hours is usually so bright as to saturate the active element. Therefore, the optical system further includes a light control means for controlling the ratio of light leaving to light entering the optical system from a maximum value to a minimum value. This means is usually an opaque contractile diaphram, or iris, that automatically closes ("stops down") or opens to quickly adjust the light impinging the active element to a proper intensity.

At night the cost of a television monitoring system increases because artificial lighting must be used to illuminate the camera field of view. Typical prior applications have lighting control independent of the television camera. In these applications, the light intensity must be sufficient to ensure a proper television picture under the worst possible lighting conditions, such as the middle of the night of a new moon. In other situations where there is more natural light, the automatic light control system of the television camera "stops down" to limit the sum of natural and artificial light at the active element to the proper value.

In this invention, applicant recognizes that it is more economical to turn down the artificial light with the lens nearly wide open then to stop down the lens with the artificial light on full power.

SUMMARY OF THE INVENTION

It is an object of this invention to provide an energy efficient lighting system for a television camera.

It is another object of this invention to provide a control system for television lighting that opens the camera lens and reduces the amount of artificial lighting.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the control system of this invention may comprise a television camera including transducer means for converting light from the viewing area to an electrical signal representative of the intensity of the light, and an optical system for receiving light from the viewing area including light control means as described above. Lamps provide artificial light over the viewing area when natural illumination is insufficient. The lamps are controlled using the signal from the camera transducer to provide only sufficient artificial light as is needed to keep the total of artificial and natural light leaving the optical system at a constant intensity when the ratio of output to input light of the optical system is substantially maximized.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
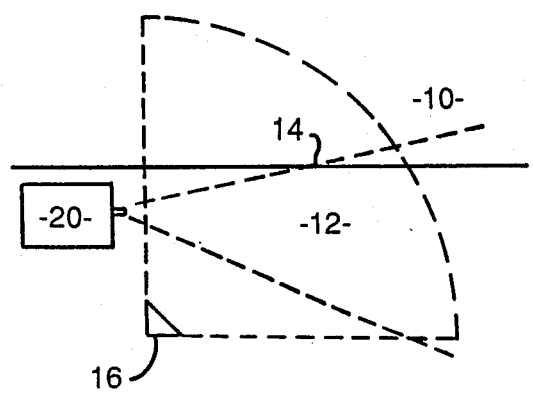
FIG. 1 is a view of a security area incorporating this invention.

In the security area depicted in FIG. 1, television camera 20 enables a remote observer (not shown) to monitor in a viewing area including fence 14 and area 12 on the controlled side of fence 14. (Area 10 on the exposed side of fence 14 is typically not monitored by camera 20, as the guard normally is interested only in activity on the controlled side.) Lamp 16 provides artificial illumination over the viewing area when natural illumination (i.e., illumination from the sun, moon or other sources outside the control of this invention) is too low to enable camera 20 to transmit a satisfactory picture. (Although only one lamp 16 is shown, it should be understood that any number of lamps may be used to illuminate the viewing area of camera 20.)

As used in a typical prior art security system, lamp 16 may typically be a 450 Watt sodium vapor bulb that will consume approximately fifty cents worth of electricity each night. In addition, burning at rated power ensures that lamp 16 has a minimum lifetime before burning out and needing changing; burning at reduced power prolongs the life of the lamp.

Figure 2:
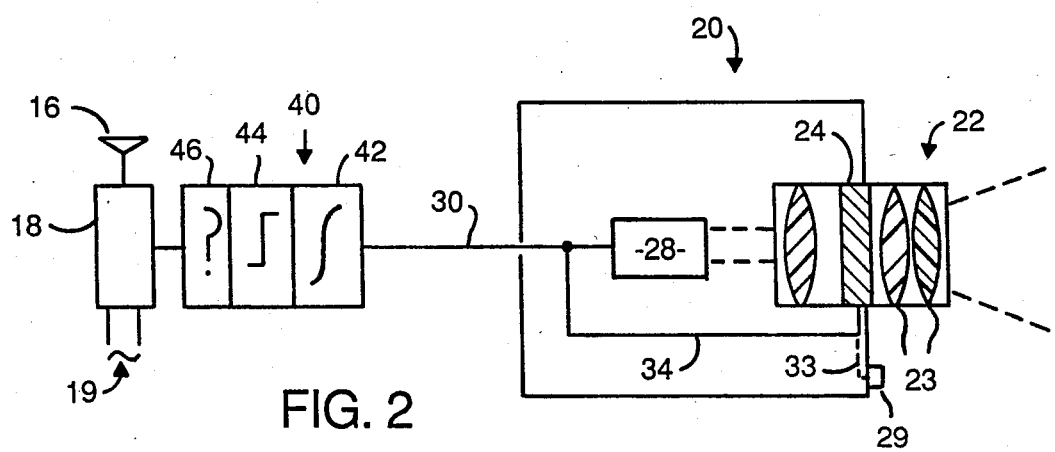
FIG. 2 is a schematic diagram of the invention incorporated into the security area of FIG. 1.

In accordance with the invention, as shown in the embodiment of FIG. 2, television camera 20 includes a conventional optical system 22 including a lens having a plurality of lens elements 23 and an optical control means 24. This means is typically an opaque contractile diaphragm, or iris, that provides a circular opening (not shown) of variable diameter along the focal path of the lens. The diameter of the opening in the iris is typically automatically controled by a control signal as described hereinafter.

Television camera 20 further comprises active element 28 for converting light from optical system 22 to an electrical representation at output 30. Conventionally, active element 28 is either a vacuum tube such as a Vidicon tube or a solid state device.

Control of the ratio of light passing optical control means 24 is by feedback of an electrical signal 34 representative of the amount of light impinging optical system 22. This signal may be generated by a transducer such as photocell 29 located either at the output end of optical system 22 or beside optical system 22 on the case of camera 20 (not shown). More conventionally, the transducer is active element 28 and signal 34 is derived from output signal 30. It is emphasized that automatic control of means 24 is conventional and well known in the television camera field, and may be accomplished by any known means consistent with the operation of the invention.

Television camera 20 also includes other conventional electrical circuitry (not shown) for converting the output of active element 28 into a television signal. For the purposes of the embodiment of FIG. 2, it may be assumed that this circuitry is incorporated in active element 28 so that signal 30 has the conventional television format shown in FIG. 3. This circuitry is not discussed in detail as, in one form or another, it is part of every television camera. Furthermore, it is not pertinent to the invention. As will be discussed below, what is important is that some portion of camera 20 function as a transducer of light to electricity such that signal 30 provides an indication of the light intensity striking active element 28. The conventional television signal of FIG. 3 provides this information; and the unprocessed output of active element 28 provides this information. Either signal could be signal 30 in accordance with this invention.

Figure 3A:
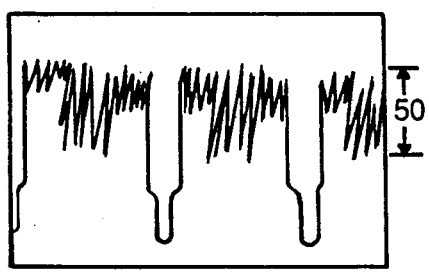
FIGS. 3a–3b show a representation of an electrical signal used in the practice of the invention.

FIG. 3a shows the standard television signal 30 at the output of camera 20 under normal lighting conditions. The amount of light picked up by camera 20 is indicated by the average video signal amplitude 50, which signal may be about ½ volt. Upper portion 52 of this signal indicates the black level (i.e., the voltage that causes the picture to be black) and the lower portion 54 indicates the white level.

Figure 3B:
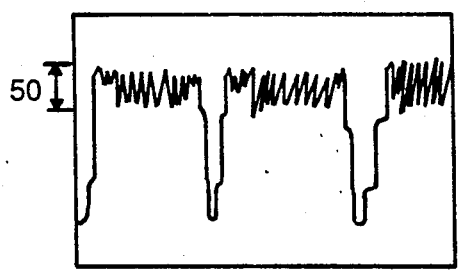

Under low light conditions the video signal, as shown in FIG. 3b, is of much lower amplitude than under normal light conditions. Camera 20 quickly and automatically compensates for the lower light when this lower amplitude is detected to cause light control means 24 to increase the ratio of light passed therethrough until signal amplitude increases to the level of FIG. 3a. When light control means 24 is passing a maximum ratio of light, and the light level is still insufficient for a signal level as shown in FIG. 3a then artificial light must be used to illuminate the viewing area.

Referring again to the embodiment shown in FIG. 2, lamp control means 40 includes an integrator 42, a comparator 44 and a processor 46. Integrator 42 receives as an input a signal containing information indicative of received light level such as video signal 30. This signal may be in either analog or digital form. In either event, the video signal is integrated to provide a signal proportional to received light. If an analog video signal is used, integrator 42 may be an RC integrating circuit; for a digital video signal it could be a counter to add the amplitudes of the video signals over a period of time to provide an indication of light. In either case, the output of integrator 42 provides an input for comparator 44. In the event that the received light is below the desired level for an adequate picture, comparator 44 provides an output signal to processor 46. (It is noted that comparator 44 should never receive a signal indicative of too much light. As illumination received by camera 20 increases, optical control means 24 reduces the ratio of light received by active element 28, keeping the average amplitude 50 at a desired value. Furthermore, the response of optical control means 24 must be faster than the response of lamp control means 40 to prevent the invention from interfering with the normal operation of camera 20. However, a signal at comparator 44 representative of too much light may be used as an indication of camera malfunction or sabotage.) Processor 46 is preferrably a microprocessor programmed in accordance with the flow-chart of FIG. 4, although it may also be a hard-wired circuit as shown in FIG. 5. Ballast 18 is a commercially available device of a type common in theater lighting that controls the amount of lamp power 19 fed to lamp 16 to vary the intensity of light therefrom. In the specific embodiments enumerated below, control of lamp 16 is assumed to be in linear increments of power from off to full power. For many lamps, no illumination occurs at less than 10% of rated power; accordingly, ten or fewer power increments would be used in the preferred embodiment.

Figure 4:
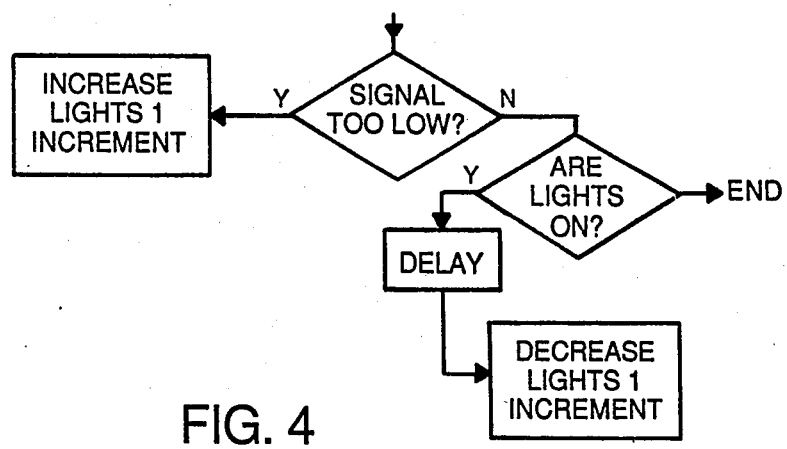
FIG. 4 is a flow chart of a program for computer operation of the invention.
Figure 5:
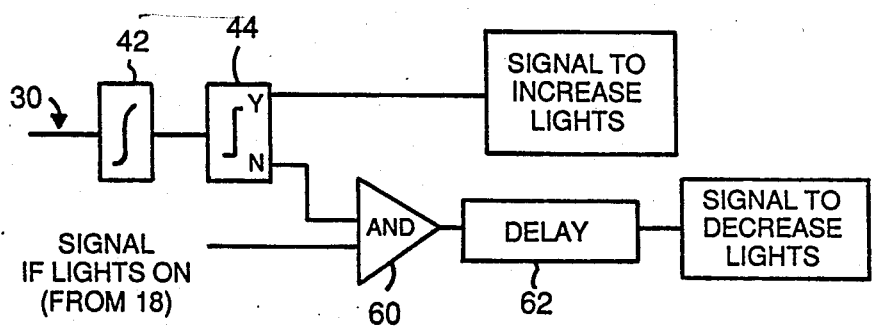
FIG. 5 shows a hard-wired controller for the invention.

Referring to the flow-chart of FIG. 4, processor 46 is not called into operation until natural light received by camera 20 is insufficient to produce a satisfactory picture, for if the signal is not too low and the lights are not on, a satisfactory television signal will be produced by camera 20. If the television signal is too low, a signal is provided from lamp control means 40 to ballast 18 to increase the power to lamp 16 by one increment. If the combination of natural and artificial illumination is still insufficient to drive amplitude 50 to a normal value, processor 46 will instruct ballast 18 to increase the power to lamp 16 by another increment. This process will continue until comparator 42 indicates the signal level is normal.

As stated above, a purpose of this invention is to control the artificial illumination from lamps 16 such that the total intensity from artificial and natural light is constant while light control means 24 is set to pass a substantially maximum ratio of light. In other words, the system must lower the power applied to lamps 16 if the natural illumination increases due to moonrise, sunrise, etc. Accordingly, means must be provided to compensate for the tendency of optical control means 24 to maintain the level of video signal 30 at a normal level as light received by camera 20 increases. Without such compensation, as natural light increased, optical control means 24 would stop down, and controller 40 would never turn down the artifical lighting.

Accordingly, if comparator 44 does indicates the signal level is normal and the lights are on, after a suitable delay ballast 18 is directed to lower the power to lamp 16 by one increment. If optical control means 24 are not set to pass a maximum ratio of light, this means will open further to adjust the magnitude of the video signal to a level indicative of a proper television image. If optical control means 24 is set to pass a maximum ratio of light, and if natural light had not increased during the delay period, comparator 44 would quickly detect the insuffcent light level and instruct ballast 18 to increase the lamp power to its previous level. If, however, natural light had increased during the delay period, optical control means 24 (which had stopped down in response to the increase in light) would open again to maintain amplitude 50 at a normal level with lamp 16 at a reduced power level. As natural light continues to increase (as, for example, because of sunrise), controller 40 will continue to reduce power until lamp 16 is turned off.

FIG. 5 shows a hard-wired lamp control means, or controller, 40. Comparator 44 receives a signal from integrator 42 and provides a signal Y if light is too low and a signal N if it is sufficient. Signal Y causes ballast 18 to increase the power to lamp 16 by one increment. Signal N provides one input to AND gate 60. The other input to AND gate 60 is a signal from ballast 18 indicating lamp 16 is on. When both signals are applied to AND gate 60, the output therefrom initiates timer 62. After the delay period, ballast 18 is instructed to reduce power to lamp 16 by one increment.

The delay of timer 62 of the foregoing embodiment is chosen to prevent lamp 16 from rapidly cycling in power because of system dynamics. If other means are provided to turn lamp 16 off at sunrise, a relatively long delay may be satisfactory. Without such other means, a five minute delay will enable lamp 16 to turn off in a reasonable time as the sun rises, assuming that off to full power is accomplished in ten increments or less.

The invention may also be operated such that optical control means 24 is about 90% open during normal night operation, thereby providing a reserve capacity for optical control means 24. Camera 20 typically provides an electrical signal to a meter to indicate the extent of opening of optical control means 24. This signal could be used to provide controller 40 with an indication of when optical control means is between 85-95% open, still a substantially maximum ratio of light being transmitted. The delay would then be eliminated from the flowchart of FIG. 4, as when the video signal is not too low, and the lights are on, if means 24 was less than 85% open the lighting power would be decreased one increment (thereby providing less light and causing means 24 to open more completely), and if means 24 was more than 95% open the lighting power would be increased one increment (thereby providing more light and causing means 24 to close).

The use of a microprocessor for examining digital video signals is especially advantageous in security applications. For example, the microprocessor could easily be programmed to sound an alarm if the video signal went white, indicating an intruder was shining a bright light on camera 20. Furthermore, failure of the video signal, indicating failure of camera 20 due to natural causes or sabotage, could also sound an alarm.

This invention provides a light control for a television security system where the use of artificial light is held to the minimum power necessary to ensure a proper television picture with the camera iris almost completely open. It is intended that the scope of the invention be defined by the claims appended hereto.

I claim:

1. A television light intensity control system for a viewing area subjected to natural and controlable artificial light comprising:
   a television camera comprising:
      transducer means for converting light from the viewing area to an first signal representative of the intensity of the light; and
      an optical system for transmitting light from said viewing area into said camera, said system including optical control means for automatically controling from a maximum value to a minimum value the ratio of light passing from said optical system to light incident upon said optical system;
   lamp means for providing the artificial light over the viewing area; and
   lamp control means for using the first signal from said transducer means to control the intensity of artificial light from said lamp means to provide only sufficient artificial light as needed to keep the total of artificial and natural light leaving said optical system at a constant intensity, said artificial light being provided while the ratio of said optical control means is a substantually maximum value, said constant intensity being sufficient for said camera to generate a television video signal representative of a satisfactory television picture.

2. The intensity control system of claim 1 wherein said first signal is said television video signal.

3. The intensity control system of claim 1 wherein said transducer means is a photocell and said first signal is an output of said cell.

4. The intensity control system of claim 1 wherein said optical system further includes a lens means for receiving light from said viewing area.

5. The intensity control system of claim 1 wherein said optical control means is connected to receive said first signal, said optical control means automatically controlling said ratio in response to said signal.

6. The intensity control system of claim 5 wherein said lamp control means comprises means for generating a second signal when said first signal indicates the total light leaving said optical system is less than said constant intensity, and
   means responsive to said second signal for increasing the intensity of the artificial light from said lamp.

7. The intensity control means of claim 6 wherein said lamp control means further comprises means for generating a third signal when said firt signal indicates the total light leaving said optical system is said constant intensity, and said lamp is on, and
   means responsive to said third signal for decreasing the intensity of the artificial light from said lamp.

8. The intensity control system of claim 5 wherein said light control means is a microprocessor programmed to increase the intensity of light from said lamp means when the first signal indicates light from the viewing area is lower than said constant intensity, and to occasionally decrease the intensity of light from said lamp means when the first signal indicates light from the viewing area is at said constant intensity.

9. The intensity control system of claim 5 wherein said light control means is a microprocessor programmed to increase the intensity of light from said lamp means when the ratio of light passing said optical control means is more than 95%, and to decrease the intensity of light when the ratio of light passing said optical control means is less than 85%.

* * * * *